March 7, 1933.  W. R. CHESLEY  1,900,225

SPLASH GUARD HOLDER FOR VEHICLE FENDERS

Filed May 25, 1931

Inventor:
Walter R. Chesley
By Owen W. Kennedy
Attorney

Patented Mar. 7, 1933

1,900,225

UNITED STATES PATENT OFFICE

WALTER R. CHESLEY, OF SOMERVILLE, MASSACHUSETTS, ASSIGNOR TO PERSONS-MAJESTIC MANUFACTURING COMPANY, OF WORCESTER, MASSACHUSETTS, A CORPORATION OF MASSACHUSETTS

SPLASH GUARD HOLDER FOR VEHICLE FENDERS

Application filed May 25, 1931. Serial No. 539,351.

The present invention relates to splash guards or shields that are adapted to be attached to the rear fenders of motor vehicles so as to protect the rear portion of the vehicle from material thrown up by the wheels, when the vehicle is in motion.

The object of the invention is to provide an improved holder for splash guards that cooperates with the downwardly extending flanges of a vehicle fender in such a manner that a given holder will fit many different widths of fenders without requiring any adjustment. Furthermore, the improved holder is adapted to be attached to or removed from a vehicle fender without requiring the use of any tools, so that its many advantages over other types of holders are readily apparent. The above and other advantageous features of the invention will hereinafter more fully appear from the following description with reference to the accompanying drawing, in which:—

Like reference characters refer to like parts in the different figures.

Figure 1:
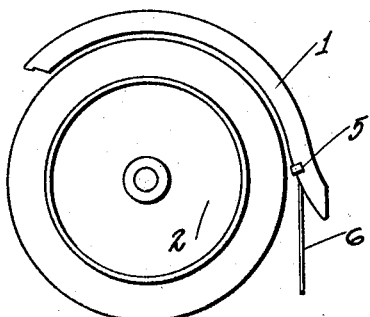
Fig. 1 is a view in side elevation of the wheel of a motor vehicle having its overhanding fender equipped with a splash guard embodying the invention.
Figure 2:
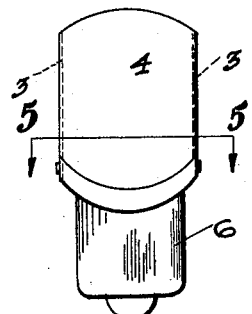
Fig. 2 is a view in end elevation of the parts shown in Fig. 1 as viewed from the right.

Referring first to Figs. 1 and 2, a portion of the rear fender 1 of a motor vehicle is shown in its usual relation to a portion of the wheel 2 which the fender 1 partially encircles. The fender 1 provides opposed downwardly extending parallel flanges 3, 3 bounding the curved body portion or crown 4, and since the distance between the flanges 3 varies with different widths of fenders, the present invention contemplates the provision of a holder 5 that is adapted to support a suitable splash guard flap or apron 6 from a fender 1 having the width shown in Fig. 2, or from other fenders of different widths, within the range of extensibility of the holder.

Figure 3:
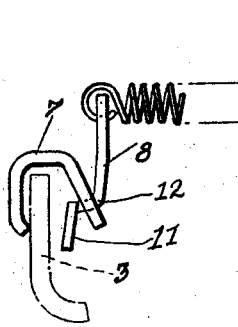
Fig. 3 is a plan view of the holder shown in Fig. 2, removed from the fender, the parts being on enlarged scale.
Figure 4:
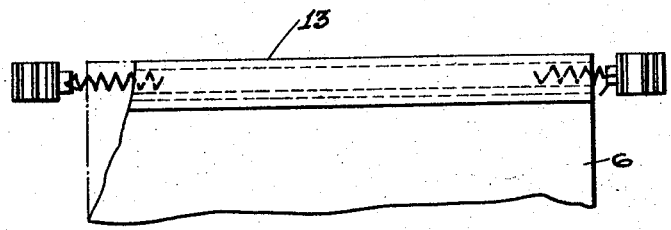
Fig. 4 is a view in front elevation of the holder shown in Fig. 3, having a flap or apron carried thereby.

Referring now to Figs. 3 and 4, the holder 5 comprises a pair of identical U-shaped clips 7, 7 each having a clamping lever 8 pivotally associated therewith, with the projecting ends of the levers 8, 8 secured to the ends of a coil spring 9.

Figure 7:
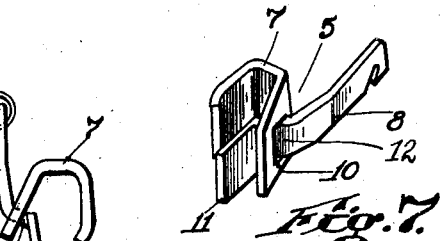
Fig. 7 is a perspective view of one of the flange engaging clips shown in Fig. 3.

As best shown in Fig. 7, each lever 8 passes freely through a slot 10 provided in one side of the clip 7, the lever terminating in a head 11 beyond the other side of the slot 10 with an offset portion 12 between the lever and the head 11. Consequently, when the lever 8 is inserted through the slot 10, the head 11 cannot pass through and the whole lever tends to pivot on one edge of the slot 10 in response to a force applied at its free end where the spring 9 is attached. As previously pointed out, the clips 7 are identical, and in assembling the holder the levers 8 are in opposed relation so that they tend to turn in opposite directions with reference to the ends of the spring 9.

Figure 5:
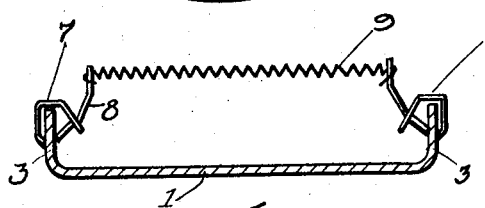
Fig. 5 is a horizontal sectional view along the line 5, 5 of Fig. 2, showing on an enlarged scale the cooperation of the holder with the fender flanges.
Figure 6:
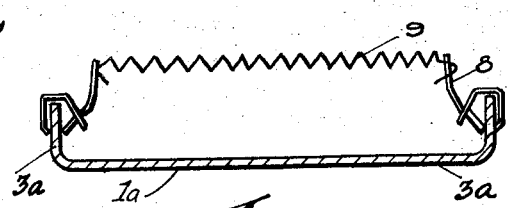
Fig. 6 is a view similar to Fig. 5, showing the cooperation of the holder with the flanges of a fender of greater width than the holder shown in Fig. 5.

When it is desired to attach a holder 5 to a fender 1, one clip 7 is positioned to embrace a fender flange 3 and while maintaining this clip in position, the other clip is similarly engaged with the opposite fender flange. Due to the pivotal mounting of such lever 8, it is obvious that as soon as a pull is exerted on the end either lever through the spring 9, the head 11 will be turned to engage the flange, as shown in Fig. 5, the pressure of the head 11 increasing as the pull on the lever 8 is increased. Furthermore, in moving the other clip to embrace the opposite fender flange, the spring 9 is stretched to some extent so that when the second clip has been attached the pull of the extended spring 9 tends to turn both levers 8 in opposite directions so as to hold the heads 11 in clamping engagement with the flanges 3, as shown in Fig. 5. In Fig. 6 the two clips 7 and the attached spring 9 are shown as applied to the flanges 3a of a fender 1a having a greater width than the fender 1, in which case the spring 9 is distended to take care of the increased distance between the flanges. Obviously, the holder will be equally effective when applied to fenders ranging between the widths of the fenders shown in Figs. 5 and 6.

As previously pointed out, the holder 5 is adapted to support a suitable mud guard flap or apron 6 between the flanges 3, and insofar as the present invention is concerned, this flap 6 may be of any desired form or material. In Fig. 4 a portion of the flap 6 is shown as providing a loop 13 through which the spring 9 may be passed before attaching the clips 7 and levers 8, 8 thereto, although it is obvious that the flap 6 can be attached after the assembly of the holder parts.

From the foregoing it is apparent that by the present invention there is provided an extremely simple and effective holder for splash guards that is universal in its application to vehicle fenders of many different widths, without requiring any predetermined adjustment and without requiring the use of any tools whatsoever in attaching the holder to or removing it from a fender.

I claim,

1. The combination with a vehicle fender having spaced downwardly extending flanges, of a holder for supporting a guard or flap from said fender, comprising a pair of clips each adapted to embrace a fender flange and each providing a projecting lever and means for exerting a force tending to turn said levers in opposite directions to engage said flanges.

2. The combination with a vehicle fender having spaced downwardly extending flanges, of a holder for supporting a guard or flap from said fender, comprising a pair of clips each adapted to embrace a fender flange and each providing a projecting lever and an extensible resilient member shorter than the distance between said flanges adapted by its extension to exert a pull away from each fender flange and thereby turn said levers into clamping engagement with said flanges.

3. The combination with a vehicle fender having spaced downwardly extending flanges, of a holder for supporting a guard or flap from said fender, comprising a pair of clips each adapted to embrace a fender flange and each providing a projecting lever and a spring connected at its ends to said levers to maintain them in clamping engagement with said flanges.

WALTER R. CHESLEY.